United States Patent
Carver et al.

(10) Patent No.: US 7,180,643 B2
(45) Date of Patent: Feb. 20, 2007

(54) LIVE PRINT SCANNER WITH HOLOGRAPHIC IMAGING A DIFFERENT MAGNIFICATIONS

(75) Inventors: John F. Carver, Palm City, FL (US); George W. McClurg, Jensen Beach, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 11/209,037

(22) Filed: Aug. 23, 2005

(65) Prior Publication Data

US 2006/0039049 A1 Feb. 23, 2006

Related U.S. Application Data

(60) Provisional application No. 60/603,282, filed on Aug. 23, 2004.

(51) Int. Cl.
  *G03H 1/00* (2006.01)
(52) U.S. Cl. .................. 359/2; 359/15; 382/124; 382/125
(58) Field of Classification Search ............ 359/1, 359/2, 15; 382/124–127
  See application file for complete search history.

(56) References Cited

U.S. PATENT DOCUMENTS

| | | | |
|---|---|---|---|
| 3,704,949 A | 12/1972 | Thomas et al. | |
| 4,728,186 A | 3/1988 | Eguchi et al. | |
| 5,095,194 A | 3/1992 | Barbanell | |
| 5,138,468 A | 8/1992 | Barbanell | |
| 5,473,144 A | 12/1995 | Mathurin, Jr. | |
| 5,629,764 A | 5/1997 | Bahuguna et al. | |
| 5,732,148 A | 3/1998 | Keagy et al. | |
| 5,737,439 A | 4/1998 | Lapsley et al. | |
| 5,796,858 A | 8/1998 | Zhou et al. | |
| 5,892,599 A | 4/1999 | Bahuguna | |
| 5,986,746 A * | 11/1999 | Metz et al. .................. | 356/71 |
| 6,002,499 A | 12/1999 | Corboline et al. | |

(Continued)

FOREIGN PATENT DOCUMENTS

WO  WO 03/063065 A1  7/2003

OTHER PUBLICATIONS

Hariharan, P., *Basics of Holography*, University Press, Cambridge, United Kingdom, pp. v-ix, 1-14 and 102-111 (2002).

(Continued)

*Primary Examiner*—Leonidas Boutsikaris
(74) *Attorney, Agent, or Firm*—Sterne, Kessler, Goldstein & Fox P.L.L.C.

(57) ABSTRACT

This invention relates to the use of holographic optical elements in the design and application of biometric scanning instruments used typically for capturing biometric information such as fingerprints and handprints. A system and method for capturing print images from select areas of a platen are presented. The system includes a reference beam source that provides a reference beam, holographic material that receives the reference beam, a platen on a surface of the holographic material that receives a biometric object, and an image sensor. Variations in orientation of the reference beam cause differing areas of the platen to be mapped onto the image sensor, thereby obtaining both different image translations and magnifications of at least a portion of the biometric object.

6 Claims, 3 Drawing Sheets

U.S. PATENT DOCUMENTS

| | | | |
|---|---|---|---|
| 6,038,043 | A | 3/2000 | Bahuguna et al. |
| 6,061,463 | A | 5/2000 | Metz et al. |
| 6,069,969 | A | 5/2000 | Keagy et al. |
| 6,111,671 | A | 8/2000 | Bahuguna et al. |
| 6,341,028 | B1 | 1/2002 | Bahuguna et al. |
| 2003/0086591 | A1 | 5/2003 | Simon |

OTHER PUBLICATIONS

Hecht, E., *Optics*, 4th Edition, Addison Wesley, San Francisco, CA, pp. 623-639 (2002).

Igaki, S., et al., "Holographic Fingerprint Sensor," *Fujitsu Scientific & Technical Journal*, vol. 25, No. 4, pp. 287-296 (Jan. 1990).

Maltoni, D., et al., *Handbook of Fingerprint Recognition*, Springer Science+Business Media, Inc., New York, NY, pp. v-vii and 1-82 (2003).

Co-pending U.S. Appl. No. 11/208,851, inventors Carver, J., et al., filed Aug. 23, 2005, entitled "Optical Comparator and Method to Compare Biometric Information" (available in the Image File Wrapper in Private PAIR).

Co-pending U.S. Appl. No. 11/209,033, inventors Carver, J., et al., filed Aug. 23, 2005, entitled "Systems and Methods of Capturing Prints with a Holographic Optical Element" (available in the Image File Wrapper in Private PAIR).

Co-pending U.S. Appl. No. 11/209,038, inventors Carver, J., et al., filed Aug. 23, 2005, entitled "Live Print Scanner with Holographic Platen" (available in the Image File Wrapper in Private PAIR).

Co-pending U.S. Appl. No. 11/209,048, inventors Carver, J., et al., filed Aug. 23, 2005, entitled "Live Print Scanner with Active Holographic Platen" (available in the Image File Wrapper in Private PAIR).

\* cited by examiner

LIVE PRINT SCANNER WITH HOLOGRAPHIC IMAGING A DIFFERENT MAGNIFICATIONS

CROSS-REFERENCE TO RELATED APPLICATIONS

This application claims benefit to U.S. Provisional Pat. Appl. No. 60/603,282, filed Aug. 23, 2004, the disclosure of which is hereby incorporated by reference herein in its entirety.

BRIEF SUMMARY OF THE INVENTION

This invention relates to the use of holographic optical elements in the design and application of biometric scanning instruments used typically for capturing biometric information such as fingerprints and handprints. Holographic optical elements can be used in place of conventional print scanning elements, such as platens and prisms, to provide the opportunity for print scanning manufacturers to reduce product development cycle times, reduce product cost, size, and weight, and provide optical design flexibility not afforded by common glass and plastic refractive optical elements.

A system and method for capturing print images from select areas of a platen are presented. The system includes a reference beam source that provides a reference beam, holographic material that receives the reference beam, a platen on a surface of the holographic material that receives a biometric object, and an image sensor. Variations in orientation of the reference beam cause differing areas of the holographic platen to be mapped onto the image sensor, thereby obtaining both different image translations (i.e., images mapping to differing portions of the image sensor) and magnifications of at least a portion of the biometric object.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Holographic technologies can be used to realize a number of different devices, such as holographic secure optical keying devices, holographic portable personalized identification devices, non-contact optical doppler biometric scanners, etc. Holographic material is used in biometric scanners, such as live print scanners, to capture biometric data and to provide additional operational features. Holographic material can be any type of holographic material or element, including but not limited to one or more holographic optical elements, holographic diffraction grating(s), holographic filter(s), holographic diffractive optic(s), or combinations thereof. An example holographic optical element may include, but is not limited to, a volume holographic optical element.

Holographic material can be configured to act as one or more optical components, such as a lens and/or mirror, at various angles of input light. In this way, holographic material can shape and direct incident reference beams to capture desired images including print images as described herein. At least one reference beam is required to be used with holographic material. In some applications, output from a coherent light source (such as a laser, for example) is separated into two or more beams for illumination and reference beam purposes. Alternatively, the reference beam may be used to illuminate the object. When holographic material is illuminated by a reference beam, a high contrast print image can be obtained. Typically, a print image will be due to frustrated total internal reflection ("TIR") caused by a reference beam at a platen surface of the holographic material in the presence of print ridges or valleys.

The present invention includes using various reference beams with holographic material used as a platen of a biometric print scanner, such as a biometric fingerprint or handprint scanner, for example. This operational feature of using holographic material as a platen can also be utilized in other types of instruments where platens are required.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Figure 1:
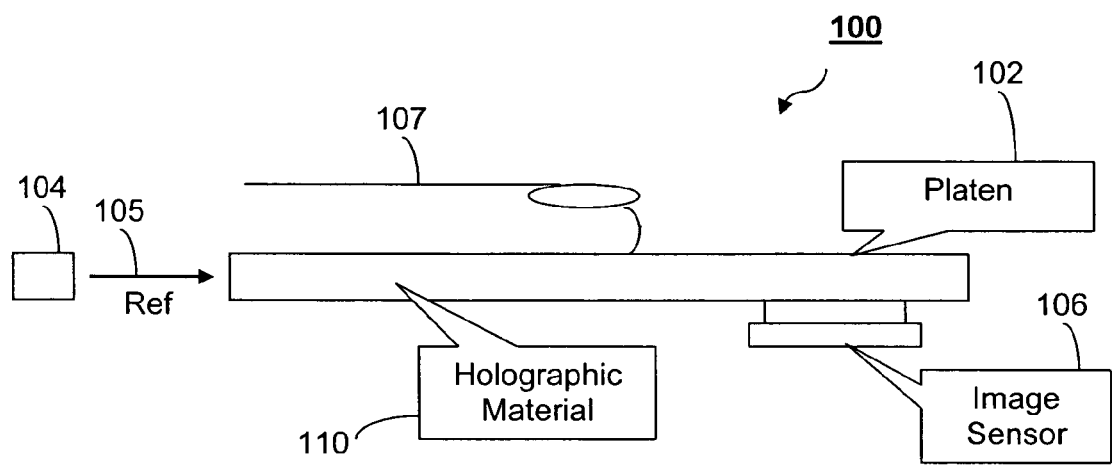
FIG. 1 depicts a holographic imaging system, according to an embodiment of the present invention.

FIG. 1 depicts a holographic imaging system 100, according to an embodiment of the present invention. Holographic imaging system 100 includes holographic material 110 having a platen 102, a reference beam source 104 that provides reference beam 105, and an image sensor 106. Platen 102 can be a surface of holographic material 110 or is at least optically coupled to the holographic material 110. A biometric object 107, such as a finger or hand, for example, is placed onto platen 102. Holographic material 110 is configured to shape, focus, and/or direct light. In particular, holographic material 110 acts to direct light from reference beam 105 to platen 102. When a reference beam 105 is provided by reference beam source 104 to holographic material 110, an image of at least a portion of platen 102, containing an image of at least a portion of biometric object 107, is received at image sensor 106.

Figure 2:
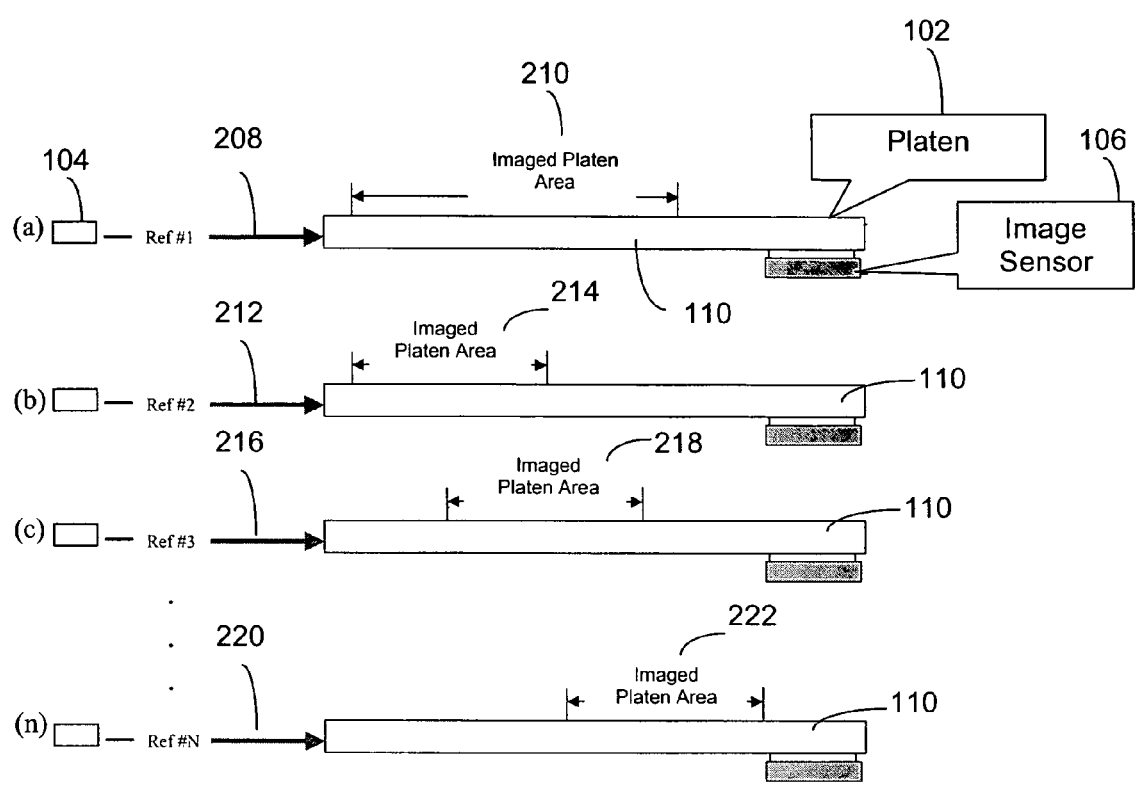
FIG. 2 depicts a holographic imaging system using multiple reference beams, according to an embodiment of the present invention.

FIG. 2 depicts a holographic imaging system, such as that shown in FIG. 1, for example, using various orientations of a reference beam, according to an embodiment of the present invention. Holographic material 110 is configured in such a way that different orientations of the reference beam allow for different image translations and/or magnifications.

In FIG. 2, the configured holographic material 110, when illuminated by various reference beams 208, 212, 216, and 220 at appropriate respective orientations, causes varying imaged platen areas 210, 214, 218, and 222 to be mapped onto the image sensor. Each of these imaged platen areas is mapped from a different location on platen 102. Each location can be of a different size. The images from these differing locations on the platen represent different image translations. In this way, when a biometric object 107 is placed on platen 102, a different portion of biometric object 107 can be imaged at image sensor 106, depending on the orientation of the reference beam.

Depending on the particular image translation and system characteristics (e.g., the arrangement and geometry of the image sensor relative to the platen area), the magnification of the image can also be changed. In other words, the configuration of the holographic material 110 and system characteristics can also determine a magnification of the resulting image.

The above description discusses the detection of different image translations and magnifications. In additional embodiments, however, one or more image translations only can be detected, one or more magnifications only can be detected, or one or more combinations thereof can be detected.

The image translation and magnification features allow a large platen area and a small platen area to be imaged at different resolutions with the same system. For example, a large area (such as that shown in imaged platen area 210 of example (a) of FIG. 2, for example) can be imaged at a reduced image resolution. The system can then be switched to a smaller region of interest (such as that shown in imaged platen area 214 of example (b) of FIG. 2, for example) and imaged at a higher, or increased, image resolution.

Alternative relationships between various orientations of the reference beams 208, 212, 216, and 220 are shown in examples (a) through (n) of FIG. 2. There are no implied relationships between the various reference beams. As would be understood by a person skilled in the relevant arts, the distance between the image and the holographic material can vary as designed.

Figure 3:
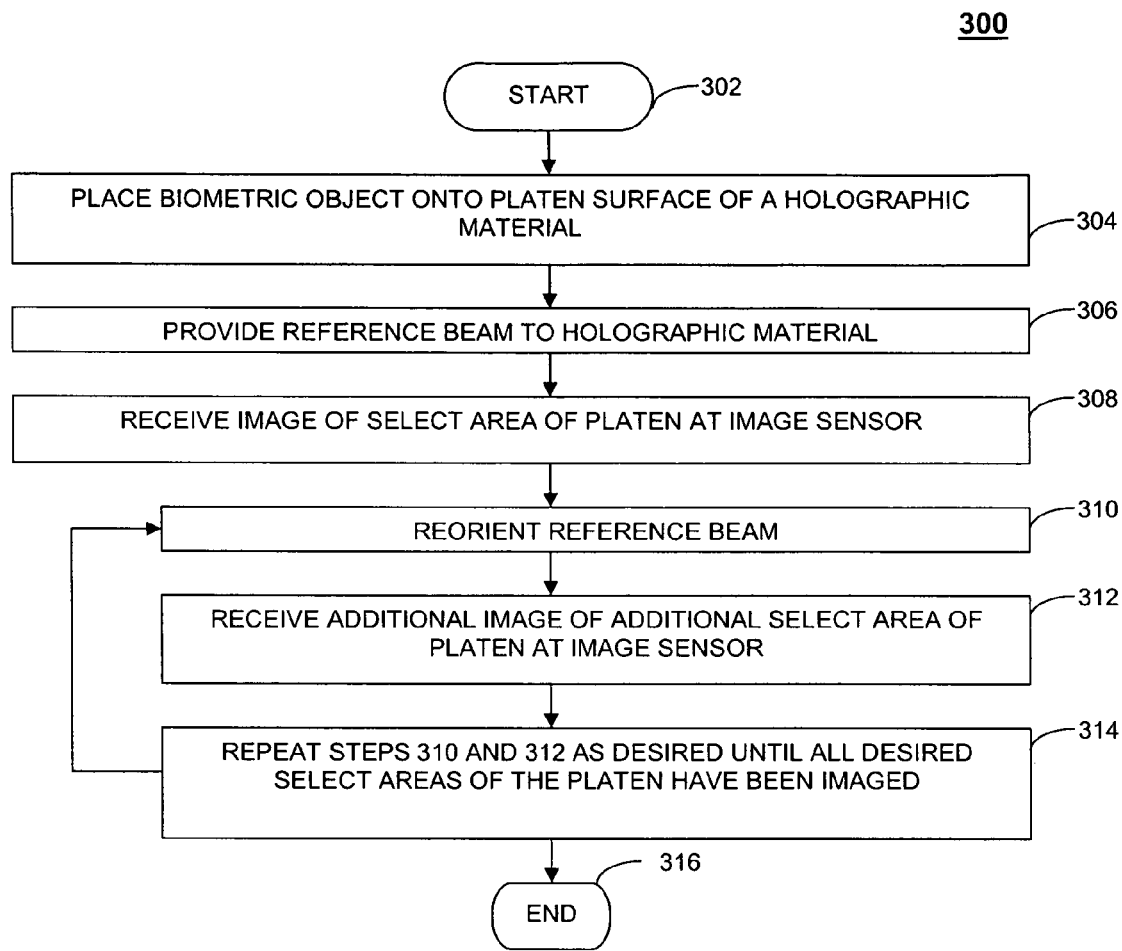
FIG. 3 is a flowchart depicting a method for capturing print images from select areas of a platen, according to an embodiment of the present invention.

FIG. 3 is a flowchart depicting a method 300 of capturing print images from select areas of a platen, corresponding to embodiments of the present invention shown in FIGS. 1 and 2. Method 300 begins at step 302 and immediately proceeds to step 304. In step 304, a biometric object, such as a hand or finger, for example, is placed onto a platen surface of a holographic material. In step 306, a reference beam is provided to the holographic material. In step 308, an image of a select area of the platen is received at an image sensor. In step 310, the reference beam is reoriented. In step 312, an additional image of an additional select area of the platen is received at the image sensor. In step 314, steps 310 and 312 are repeated until all desired select areas of the platen have been imaged. The resolution of the resulting images can be of differing resolutions, depending on the size of the platen areas imaged. Method 300 terminates at step 316.

Method 300 can be fully or partially automated. For example, a controller (not shown) can send control signals to indicate to a user to place his or her hand in step 304. As another example, the controller can send control signals to a reference beam source to provide a reference beam in step 306. The controller can also send control signals to a reference beam source to reorient the reference beam in step 310. Additionally, the controller can also send control signals to the image sensor to detect an image at steps 308, 312, and 314, as needed.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for capturing light on an image sensor, the light being directed from select areas of a platen that are configured to receive a biometric object, the image sensor configured to form print images therefrom, comprising:

the image sensor;

a reference beam source configured to output a selected one of a plurality of reference beams, each of the reference beams having a different orientation; and a holographic element, comprising, a top surface having imaging areas corresponding to the select areas of the platen, the platen being supported by the top surface, an end surface that receives the selected one of the plurality of reference beams, a body portion configured to direct the reference beam from the end surface towards a respective one of the imaging areas and corresponding ones of the select areas based upon the orientation of the reference beam, the reference beam interacting with the biometric object through reflection from the top surface of the holographic element, such that, through frustrated total internal reflection between the reference beam and the biometric object, biometric information correlating to the biometric object is generated, and a bottom surface configured to transmit the biometric information received from the top surface and the body portion of the holographic element toward the image sensor, wherein different image translations or different magnifications of at least a portion of the biometric object are generated in the biometric information based on which of the select areas and which of the imaging areas the reference beam was directed towards by the body portion, which is based on the orientation of the reference beam.

2. The system of claim 1, wherein the orientation of incidence of the reference beam at the end surface of the holographic element allows the biometric information from a large area of the biometric object to be directed onto the image sensor at a reduced resolution.

3. The system of claim 1, wherein the orientation of incidence of the reference beam at the end surface of the holographic element allows the biometric information from a small area of the biometric object to be directed onto the image sensor at an increased resolution.

4. A method for capturing light on an image sensor, the light being directed from select areas of a platen that are configured to receive a biometric object, the image sensor configured to form print images therefrom, comprising:

outputting a selected one of a plurality of reference beams, each of the reference beams having a different orientation; and supporting a platen on a top surface of a holographic element, the top surface having imaging areas corresponding to the select areas of the platen;

receiving the selected one of the plurality of reference beams at an end surface of the holographic element;

directing the reference beam from the end surface towards a respective one of the imaging areas and corresponding ones of the select areas based upon the orientation of the reference beam using a body portion of the holographic element, the reference beam interacting with the biometric object through reflection from the top surface of the holographic element, such that, through frustrated total internal reflection between the reference beam and the biometric object, biometric information correlating to the biometric object is generated; and transmitting the biometric information received from the top surface and the body portion of the holographic element toward the image sensor via a bottom surface of the holographic element;

wherein different image translations or different magnifications of at least a portion of the biometric object are generated in the biometric information based on which of the select areas and which of the imaging areas the reference beam was directed towards by the body portion, which is based on the orientation of the reference beam.

5. The method of claim 4, wherein the orientation of the reference beams received on the end surface of the holographic element allows biometric information from a large area of the biometric object to be directed onto the image sensor at a reduced resolution.

6. The method of claim 4, wherein the orientation of the reference beams received on the end surface of the holographic element allows biometric information from a small area of the biometric object to be directed onto the image sensor at an increased resolution.

* * * * *

UNITED STATES PATENT AND TRADEMARK OFFICE
CERTIFICATE OF CORRECTION

| | | |
|---|---|---|
| PATENT NO. | : 7,180,643 B2 | Page 1 of 1 |
| APPLICATION NO. | : 11/209037 | |
| DATED | : February 20, 2007 | |
| INVENTOR(S) | : John F. Carver | |

It is certified that error appears in the above-identified patent and that said Letters Patent is hereby corrected as shown below:

Title page, Item [54], please replace "Live Print Scanner with Holographic Imaging a Different Magnifications" with --Live Print Scanner with Holographic Imaging at Different Magnifications--.

Also at Column 1, line 2, please replace "Live Print Scanner with Holographic Imaging a Different Magnifications" with --Live Print Scanner with Holographic Imaging at Different Magnifications--.

Signed and Sealed this

Twenty-ninth Day of May, 2007

JON W. DUDAS
*Director of the United States Patent and Trademark Office*